United States Patent [19]

Labell

[11] Patent Number: 4,984,791
[45] Date of Patent: Jan. 15, 1991

[54] GREEN INCLINATION LEVEL FOR GOLFERS

[76] Inventor: Larry Labell, 1100 N. Alta Loma Rd., Suite 502, Los Angeles, Calif. 90069

[21] Appl. No.: 416,995

[22] Filed: Oct. 2, 1989

[51] Int. Cl.$^5$ .............................................. A63B 57/00
[52] U.S. Cl. ................................ 273/32 H; 273/32 B; 33/367
[58] Field of Search ............... 273/32 B, 32 H, 162 R, 273/162 B, 162 F, 163 R, 163 A, 164; 33/334, 367, 377, 379, 381, 389, 390

[56] References Cited

U.S. PATENT DOCUMENTS

| | | | |
|---|---|---|---|
| 1,204,768 | 11/1916 | Hommel | 33/390 |
| 2,724,898 | 11/1955 | Douglass | 33/63 |
| 2,919,491 | 1/1960 | Darrell et al. | 273/162 B |
| 2,995,375 | 8/1961 | Bukovey | 273/162 B |
| 3,186,092 | 6/1965 | Bertas | 33/64 |
| 3,242,582 | 3/1966 | Garrett | 273/162 B |
| 3,293,755 | 12/1966 | Cronwell | 33/46 |
| 3,429,576 | 2/1969 | Ikeda | 273/162 B |
| 3,535,792 | 10/1970 | Douglas | 33/16 |
| 3,751,819 | 8/1973 | Dixon | 33/389 |
| 3,870,299 | 3/1975 | Howe | 273/32 B |
| 3,871,104 | 3/1975 | Underhill | 33/262 |
| 3,909,004 | 9/1975 | Vella | 273/167 F |
| 4,082,286 | 4/1978 | La Breche | 273/162 B |
| 4,109,392 | 8/1978 | Streeter | 33/381 |
| 4,258,475 | 3/1981 | Buckley | 33/283 |
| 4,260,151 | 4/1981 | Weaver | 273/32 H |
| 4,482,155 | 11/1984 | Higley | 273/162 B |
| 4,581,782 | 4/1986 | Riley | 33/334 |
| 4,824,114 | 4/1989 | Catalano | 273/162 B |

OTHER PUBLICATIONS

"Popular Mechanics", vol. 112, No. 1, Jul., 1959, p. 124.

*Primary Examiner*—Edward M. Coven
*Assistant Examiner*—Raleigh W. Chiu
*Attorney, Agent, or Firm*—Dykema Gossett

[57] ABSTRACT

The method of facilitating putting a golf ball into a cup on a sloped green comprises providing a pair of right angularly related float levels within a hollow frame with each float level having an axis, index marks and a sighting rod in the frame; orienting the frame to a first upright plane at eye level while visually aligning the sighting rod, ball and cup maintaining the frame at right angles to the line of sight, and angularly adjusting the axis of the first level parallel to the transverse slant in the green. A further step includes noting the position of the buble in the first level relative to its central index to selectively indicate the extent and direction of slope of the green. The location of the bubble defining the ball stroking path which with the correct stroking force will assure a curved path of travel into the cup. A further step includes orienting the frame into a second plane at right angles to the first plane parallel to the line of sight and angularly adjusting the axis of the second level into parallel registry with the slope of the green up and down along the line of sight. As a further step noting the position of the bubble in the second level relative to the central index, to indicate the extent of the slope uphill or downhill to the cup, as bearing upon stroking forces. A green inclination level for golfers comprises a hollow frame having a pair of right angularly related first and second float levels with longitudinal axes and indica marks including a bubble and an elongated sighting rod in the frame parallel to the first float level for an initial visual alignment with the ball and cup.

8 Claims, 2 Drawing Sheets

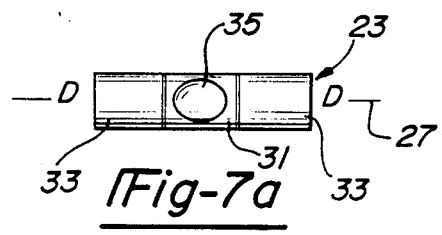
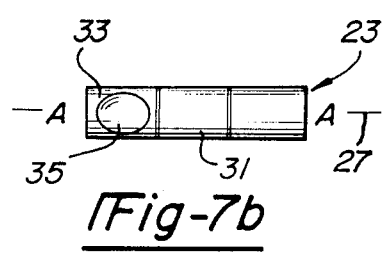
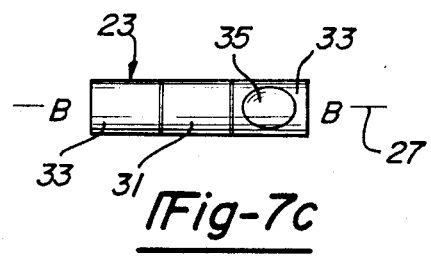
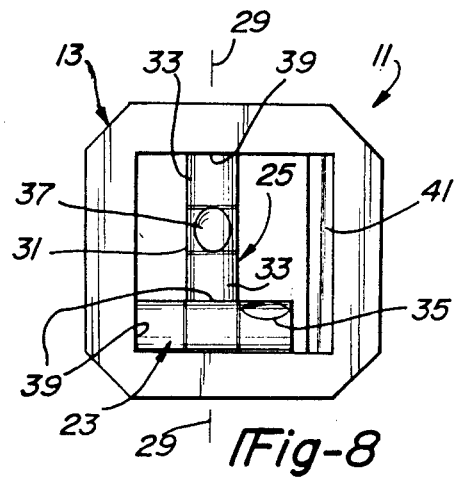
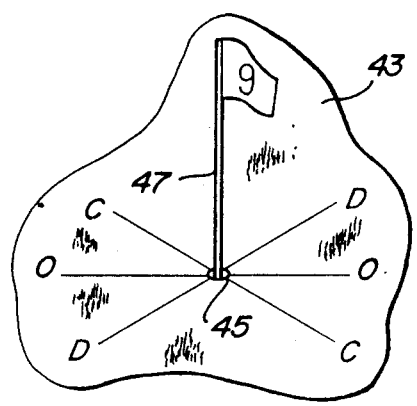
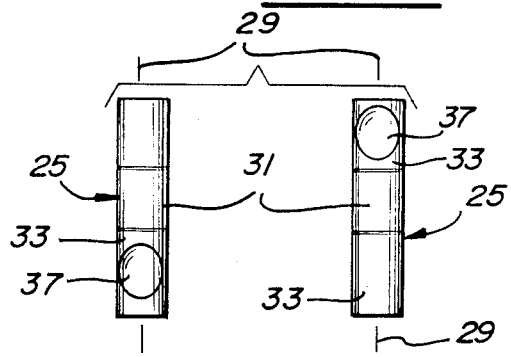
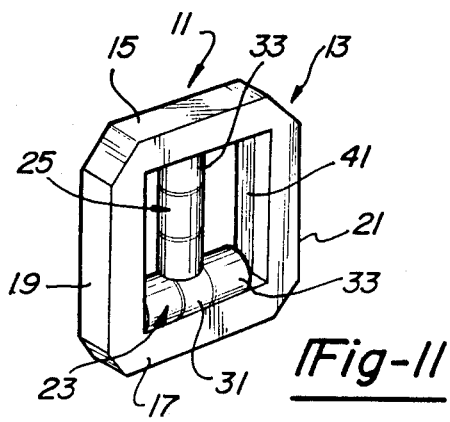

GREEN INCLINATION LEVEL FOR GOLFERS

FIELD OF INVENTION

The present invention relates to a novel article of manufacture and a method of use to facilitate teaching the art of putting and more particularly providing for the golfer a means for measuring the slope of the green.

BACKGROUND OF THE INVENTION

Previously in the sport of golfing, the usual situation for proper drainage of a putting green on a golf course is that there is an inclination thereof towards or away from the hole or cup with the result that more often than not, the stroking path of the ball is something different than a direct path to the cup. An experienced golfer must take into consideration a number of factors in an effort to accurately put the ball into the cup which include the nature of the green as being fast or slow, wet or dry, transverse slope of the green, up or down towards the cup, and the inclination of the green from the putter to the cup uphill or downhill. There are factors pertaining to the distance of the ball from the cup and the power or extent of the stroke applied to the putter.

Various devices have been before tried including leveling devices or visual devices attachable to the golf club or held in the user's hand in order for the golfer to predetermine the extent and amount and direction of slope of the golf green as a guide in determining a correct stroking path and a correct stroking force depending upon distance of the ball from the cup. A number of efforts have been made in the art to provide sighting devices some with indicia, some with spirit levels or float levels on the golf club or elsewhere or upon separate devices for sighting the golf ball and the cup in order to ascertain the path of stroking of the ball with the required force such as will direct the ball in an indirect and curved path to the cup.

As illustrative of the prior art listed hereunder are prior art patents as follows:

| NUMBER | INVENTOR | DATE |
| --- | --- | --- |
| 3,186,092 | C. S. Bertas | June 1, 1965 |
| 3,242,582 | C. L. Garrett | March 29, 1966 |
| 3,293,755 | R. H. Cronwell | December 27, 1966 |
| 3,535,792 | H. N. Douglas | October 27, 1970 |
| 3,751,819 | Dixon | August 14, 1973 |
| 3,870,299 | Howe | March 11, 1975 |
| 3,871,104 | Underhill, II | March 18, 1975 |
| 4,082,286 | Le Breche | April 4, 1978 |
| 4,258,475 | Buckley | March 31, 1981 |
| 4,260,151 | Weaver | April 7, 1981 |
| 4,482,155 | Higley | November 13, 1984 |
| 4,824,114 | Catalano | April 25, 1989 |

SUMMARY OF THE INVENTION

An important feature of the present invention is to provide an improved method for teaching golfers how to accurately putt a golf ball into a hole on the green which has a slope and wherein a visual means is provided for determining extent and direction of inclination of the green relative to and transversely of the cup as a means by which a golfer with some experience can learn correct stroking paths as a curved indirect path for the ball which with the appropriate force and length of swing assures that the ball will roll in a curved path into the cup.

As another feature, there is provided an optical viewing device which is portable, can be carried in the pocket, is small in size so that it may be manually positioned at eye level for establishing a line of sight between a sighting rod, the ball and the cup on the green and wherein the present green inclination measure is arranged in an upright plane at right angles to the line of sight and wherein a first level is arranged with its axis so as to be in registry with the green and the line of sight such as will determine by the position of a bubble within the level, the direction and extent of the slope of the particular green.

As another feature the present invention takes into consideration that a putting green additionally may be flat in the direction of the line of sight between the ball and the cup. Or it may be inclined up or downhill. For this purpose there is provided a second right angular related float level in the present device which when oriented to a second plane parallel to the line of sight and with the axis of the second level moved into registry with the slope of the green between the ball in the line of sight to the cup such that there can be ascertained whether the path to the cup is uphill or downhill. This is a factor in determining the extent and force of the stroke necessary to advance the ball to roll it into the cup whether it be in a straight path or a curved path.

Another feature is to provide a method of facilitating putting a golf ball into a cup on a sloped golf green which comprises the steps of providing a pair of right angularly related first and second float levels within and coplanar to a hollow frame, with each level having a longitudinal axis and transverse central and outer reference indexes, together with a sighting rod in the frame parallel to the first float level. The method includes orienting the frame to a first upright plane at eye level while visually aligning the sighting rod, the golf ball and the cup on the green providing a line of sight, while maintaining the frame in a plane at right angles to such line of sight, and thereafter angularly adjusting the axis of the first level into parallel registry with any transverse slope in the green while retaining the frame in an upright plane and noting the position of the bubble of the first float level in relation to said indexes in order to indicate the extent and direction of slope of the green to said cup and wherein the bubble position designates a ball stroking path for the putter which with the required stroking force will assure a curved path of travel of the ball into the cup.

The present invention further includes a method of teaching the art of putting providing the means by which the golfer can accurately ascertain the slope and direction of slope in a putting green together with indicia relative to the float level employed for designating by the position of the bubble out of its central position the direction and extent of force required for determining a stroking path for the ball in a curve into the cup.

The present method includes the further step of orienting the frame to a second position or plane parallel to said line of sight, noting the position of the bubble of the second level in relation to the central index thereof. Thereafter, angularly adjusting the axis of the associated second float level into parallel alignment with the slope of the green between the ball and cup in the line of sight for determining the uphill or downhill slant of the green to the cup.

These and other features, methods and method steps, and objects will be seen from the following specification and claims in conjunction with the appended drawings.

THE DRAWINGS

FIGS. 7a, 7b and 7c are plan views illustrating different positioning of the bubble in the first float level corresponding to three conditions of the green transversely to the cup as levels inclined down or inclined up.

FIG. 8 is a plan view of the present green inclination level as used in a second plane at right angles to the vertical plane shown in FIG. 1 and wherein the second level is arranged with its axis in parallel alignment with the slope of the green between the ball and the cup with bubble location showing the green flat.

FIG. 9 is a schematic view of a putting green with cup and flag to illustrate the three conditions of the green between the ball and the cup with the green either flat or inclined up or inclined down.

FIG. 10 is a bracketed plane view of the second level and wherein the left illustration indicates the position of the bubble when the green is inclined downwardly to the cup and at the right illustration when the green is inclined upwardly to the cup.

FIG. 11 is a perspective view of the present green indication level.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
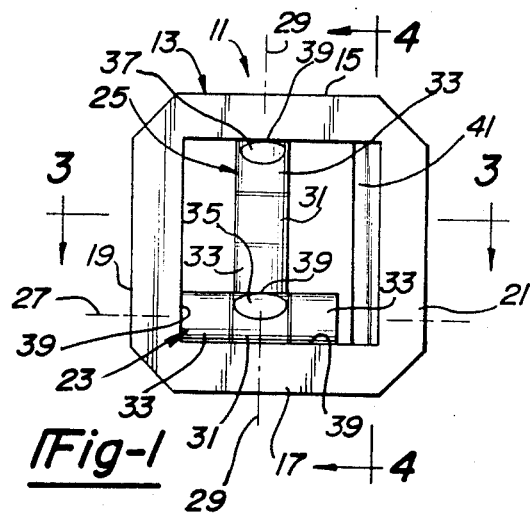
FIG. 1 is an elevational view of the green inclination level for golfers shown in an upright position or first plane, being a full scale size of the present article of manufacture.
Figure 2:
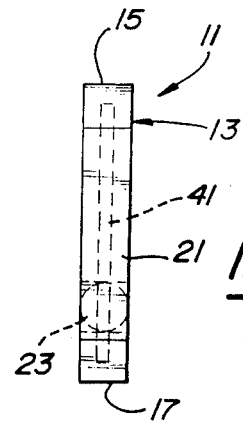
FIG. 2 is a right end elevational view thereof.
Figure 3:
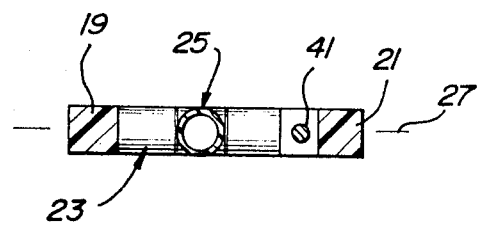
FIG. 3 is a plan section taken in the direction of arrows 3—3 of FIG. 1.
Figure 4:
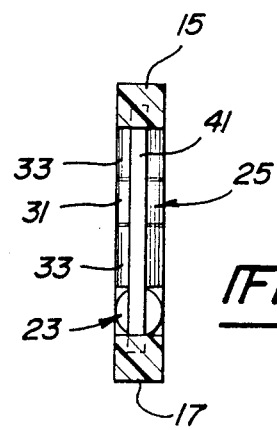
FIG. 4 is a vertical section taken in the direction of arrows 4—4 of FIG. 1.

Referring to the drawing, the present green inclination level for golfers is generally indicated at 11, FIG. 1, as including a hollow frame 13 constructed of wood or a plastic material or metal. The frame includes top 15, bottom 17 and opposed side walls 19 and 21.

A pair of right angular related first and second float levels 23 and 25 are coplanar, adhesively secured to each other as at 39 and are nested within and are coplanar with frame 13 and adhesively secured thereto as at points 39, FIG. 1.

The first float level 23 bears against side wall 19 secured thereto at 39, extends along bottom 17 and is further secured thereto at 39. The second float level 25 at its lower end engages and is secured as at 39 to a central portion of the first float level 23 and at its upper end extends to and engages and is secured at 39 to an interior portion of the top 15. Each of the float levels have longitudinal axes 27 and 29, respectively. Each of the float levels has a central index 31 and a pair of outer indexes 33 upon opposite sides thereof. Each of the float levels includes a movable air bubble 35 which depending upon the inclination of the particular float level is in either at a central index 31 or one of the outer index 33 positions relative to the central index, sometimes referred to as indicia. The respective float levels are in the form of glass or plastic transparent cylinders 23 and 25 with the respective ends sealed closed and containing a suitable transparent liquid including the corresponding bubble 35.

Positioned within the plane of the hollow frame 13 parallel to and spaced from second float level 25 and further spaced from side wall 21 is the upright sighting rod 41. Said rod extends between the top and bottom 15 and 17 of the hollow frame and is suitably secured thereto.

Figure 5:
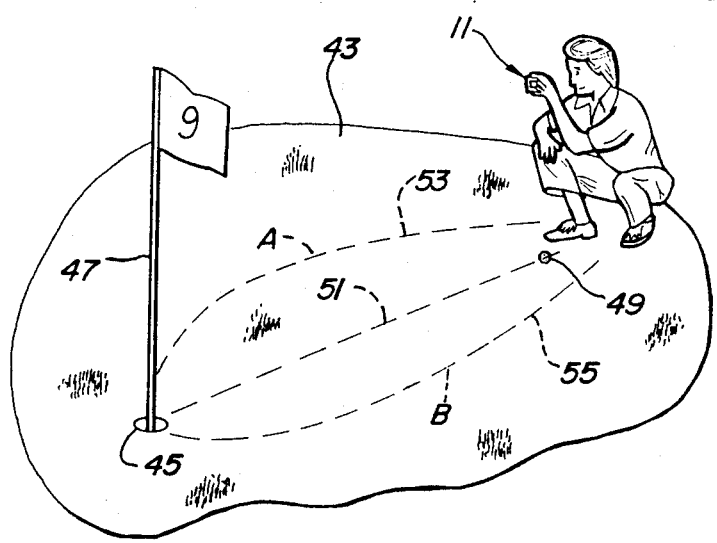
FIG. 5 is a schematic perspective view illustrating the present inclination level as used with the sighting rod in alignment with the line of sight between the ball and the cup and wherein a pair of curved paths of stroking and ball movement are shown for putting into the cup, depending upon the direction and extent of the slope of the green towards and away from the cup.
Figure 6:
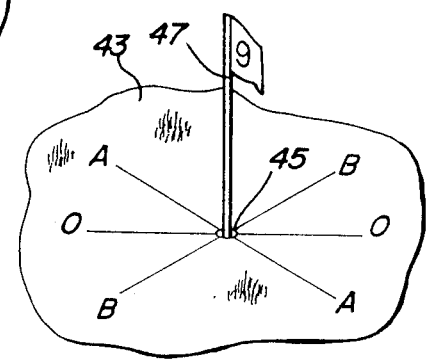
FIG. 6 is a schematic perspective view of a green with a cup and pin in position and with stroking paths for a flat or inclined green.

In the illustrative embodiment, the sighting rod has been colored green as a contrasting color and because it is used as the alignment rod in establishing a line of sight when using the present green inclination level lining up the sighting rod with the ball and with the cup on the green and/or including the pin with flag 47, such as shown in FIGS. 5, 6 and 9.

In the description of the use of the present green inclination level 11 for golfers the green is fragmentarily shown at 43 as having a cup 45 of the conventional construction and wherein as is the usual case there is some inclination of the green in a direction transverse to the direction of stroking by the putter. This is perhaps characteristic of most golf greens wherein there is the need for good water drainage. In most cases the green is not flat, but has a grade or slope therein adjacent the cup.

The conventional pin and flag is generally designated at 47 and normally occupies an upright position in the cup 45 when not in use, as a guide to golf players driving towards a particular green with the golf ball and its lie designated at 49 in several of the schematic views.

The line of sight referred to herein as established between the sighting rod 41, the ball 49 and the cup 45 and including the pin 47 is generally indicated at 51, FIG. 5. There is furthermore illustrated the curved stroke paths 53 and 55, one of which would be selectively used in the case where the use of the present green inclination level indicates that there is a slope of the green downwardly from left to right or from right to left. The respective stroking paths as well as the ball paths were designated at 53, 55 are curved paths originating at the ball 49 and terminating, if the correct force is used, and the correct angle is employed with the ball entering the cup 45.

There are a number of factors to be taken into consideration by experienced golfers which include the character of the green as being fast or slow, possibly as related to being wet or dry, whether it is perfectly flat or inclined right or left downwardly towards the pin or cup transversely of the direction of putting. Further any inclination between the ball and the cup upwardly or downwardly has a bearing upon the amount of force used in stroking the putter and ball along its path towards the cup.

Applicant has provided novel apparatus as a new article of manufacture in the nature of the green inclination level for golfers by which there can be a preliminary determination by the golfer in establishing a line of sight between the inclination level and the sighting rod thereon. This includes the ball and the cup with such tilting of the level to register with the green and bubble position as will predetermine the stroking path for the ball towards the cup and use of such sufficient force as will result in the ball reaching and dropping into the cup.

Since the art of playing good golf is more than just a game but requires an intense concentration, it would appear that in many situations with the use of the present green inclination level, a golfer may improve his putting in accordance with the present method of use. As a part of the present method, an initial step includes providing a pair of right angularly related first and second float levels 23 and 25 within and coplanar with hollow frame 13. Each level has a longitudinal axis 27 and 29, respectively, and each level includes reference indicia such as central index 31 and outermost indexes 33 spaced upon opposite sides of the central index together with a bubble 35 movable in an enclosed glass or transparent tube.

A further step includes orienting the frame 13 to a first upright plane, such as shown in FIG. 1, and in the perspective view at eye level and visually aligning the sighting rod 41, the golf ball 49 and the cup 45 and including the pin 47 to the line of sight generally designated at 51. At the same time the frame 13 is retained in a plane at right angles to the line of sight 51 between the ball 49, the cup 45 and green 43.

A further step includes angularly adjusting the axis 27 of the first level 23 to parallel registry with any transverse slope on the green 43 such as the slopes A—A or B—B of FIG. 6, while retaining the frame 13 in the upright plane of FIG. 1. Another step includes noting the position of the bubble 35 in the first float level 23 as in FIGS. 7a, 7b and 7c relative to the central index 31 in order to indicate the extent and direction of slant of the green and the direction thereof right or left.

This step is further illustrated in FIG. 7a wherein the bubble 35 registers with the central index 31 to designate that the green is level such as at O—O, FIG. 6. In this situation and without any green inclination, the putter is more likely to putt in a straight line directly to the cup 45 such as shown along the line of sight 51, FIG. 5. This is primarily because it is not necessary to take into consideration any drift which may occur due to gravity since the golf ball is rolling in a straight path.

In most usual situations, the inclination of the green will be designated such as shown in either the second or third illustrations of FIGS. 7b and 7c. In FIG. 7b, the bubble 35 has moved towards the outer indicia or index 33. This corresponds to the lines A—A, FIG. 6, indicating that the green is inclined from left to right down to the pin. This would tell the golfer that the stroking path would correspond to the path 55 of FIG. 5 out of line of sight 51 of such sufficient angle corresponding to the position and location of the bubble 35, that with the proper and sufficient force the ball 49 will roll in a curve 55 and into the cup 45. In other words, the golfer places the angle of the stroking path for the ball and putter club in the same direction as the bubble 35 with respect to the central indicia 31, namely to the left corresponding to the curved line 55 of FIG. 5.

Should the inclination be in the other direction namely inclined right to left down to the pin, the bubble will take the Position shown in FIG. 7c, extreme right or to the right of the central indicia as at 33. This will designate to the player that the stroking path should correspond to the path 53 of FIG. 5 for stroking the ball and the putter in a angular path. The important factor after having determined the correct path is the correct amount of stroking force and length of swing such as will assure that the ball will reach the cup and go no further.

There is a theory of some golfers that the factor that makes the difference is the distance of the ball to the cup. Once the angle or stroking path has been determined, the stroking path should be the same whether the ball is a short distance or a longer distance from the cup with only the change being in the amount of force applied the ball or the extent of the stroking of the putter.

As a part of the present method, the established bubble position designates the ball stroking path for the putter which, with the required stroking force, will assure a curved path of travel of the ball into the cup thereby facilitating teaching the art of putting.

With so many factors involved in determining such putting path it takes much practice and experience before there is achieved the capabilities of the professionals or others who concentrate on this sport for a living or for pleasure. In all events, the present green inclination level for golfers provides a method of use and construction by which there can be predetermined the inclination and extent and direction of slant of the slope of the green with respect to the cup together with a measuring device which is helpful to the golfer in determining the angular stroking of the ball normally in a curved path so that it rolls by gravity into the cup, with a little luck.

The present method includes the additional step of orienting the present hollow frame 13 from the upright position shown in FIG. 1 to the planar or horizontal position shown in FIG. 8 at right angles to the first position and wherein the second float level 25 is arranged in a plane which is parallel to the line of sight 51. Thereafter angularly adjusting the axis 29 of the second level into parallel registry with the slope of the green between the ball and the cup such as along the sight line 51 of FIG. 9.

If there is no inclination and the green is perfectly flat in the direction between the ball 49 and the cup 45, then the bubble 37 will be in the central or neutral position relative to the index 31, FIG. 8. Referring to FIG. 10, if there is incline of the green downhill to the cup, the bubble 37 will move towards the extreme position 33, shown in the left illustration of FIG. 10, relative to central index 31 more or less depending upon the extent of the inclination. This will correspond to the lines C—C of FIG. 9, which means that with the green inclined downhill from the putting position less force will be used on the ball than in the alternate position shown in the second illustration, FIG. 10.

There the incline is in the opposite direction and the bubble 37 is in the other position 33. The bubble 37 has moved away from the central index 31 towards one of the outer indexes 33 corresponding to an incline uphill to the pin 47 such as designated at D—D, FIG. 9. This means that there would be needed an increased force applied to the ball for putting the ball uphill to the pin and cup 45.

Thus, the present method includes the further step of noting the position of the bubble 37 in the second level 25 in relation to the central index 31 to selectively indicate the uphill or downhill incline of the green towards the cup. Thus, as a part of the present method, the golfer now has the knowledge further as to whether he is going to putt on a level surface, FIG. 8, or putt uphill or downhill, FIG. 10, in addition to knowing the transverse slope of the green for the angular putting paths 53, 55 shown for alternate use illustratively, FIG. 5.

While the sighting rod 41 has been described in conjunction with a part of the method of establishing a line of sight as at 51 between the users one eye, the ball and the cup and/or pin it is contemplated that this can be achieved by the use of the longitudinal axis 29 of the second fluid level 25 if desired utilizing the lateral space between axis 21 and sighting rod 41.

Another function for the sighting rod 41 is that once there has been proper establishment of the sighting line 51 of the present device with respect to the cup and the ball, if the pin 47 is not in registry with the sighting rod 41, it will establish that the pin is not upright as it should be. The pin can therefore be adjusted so that it is upright to give a proper guide to the putter as to the exact location of the hole particularly helpful in long distance putting.

Having described my invention, reference should now be had to the following claims:

I claim:

1. A method of facilitating the use of a putter for putting a golf ball on a sloped golf green having a cup comprising the steps of:
   (1) providing a pair of right angularly related first and second float levels within and coplanar to a hollow frame with each level having a longitudinal axis and transverse central and outer reference indicia and a sighting rod in the frame parallel to said second float level;
   (2) orienting the frame to a first upright plane at eye level;
   (3) visually aligning the sighting rod, the golf ball and said cup while maintaining said frame in a plane at right angles to the line of sight between said golf ball and said cup;
   (4) angularly adjusting the axis of said first float level into parallel registry with the transverse slope in the green while retaining the frame in said upright plane;
   (5) noting the position of the bubble of the first float level in relation to said central and outer indicia to selectively indicate the extent of downward slant of said green to said cup and its direction selectively right and left; and
   (6) designating a golf ball stroking path for the putter based upon said bubble position with such stroking force as will assure a curved path of travel of the golf ball into the cup, thereby teaching the art of putting.

2. In the method defined in claim 1, further comprising:
   (7) orienting the frame to a second plane at right angles to said first plane and parallel to said line of sight;
   (8) angularly adjusting the axis of the second level into parallel registry with the slope of the green along said line of sight; and
   (9) noting the position of the bubble of said second level in relation to its central and outer indicia to indicate selectively the uphill and downhill incline of said green toward said cup, as bearing upon said stroking force.

3. In the method of claim 1, further comprising in steps 4 and 5, wherein the position of the bubble remains at its central indicia thereby indicating the green is flat to designate a ball stroking path directly towards the cup.

4. A new article of manufacture, namely a green inclination level for golfers using a putter on a green having a cup, comprising a hollow frame having opposed top, bottom and side walls;
   a pair of coplanar right angularly related first and second float levels within said frame secured together and connected to said frame;
   each float level having a longitudinal axis and a central index and outer index spaced upon opposite sides of the central index and a bubble movable relative to said axis; and
   an elongated sighting rod secured within said frame between its top and bottom and parallel to and spaced from said second float level and one side wall;
   said frame being adapted for orienting to a first upright plane at the user's eye level for visually aligning the sighting rod, a golf ball and a cup upon a golf green, providing a line of sight, said first upright plane being at right angles to said line of sight;
   said frame being further adapted for a limited rotation in said plane until the axis of said first level is in parallel registry with the green adjacent said cup;
   the position of the bubble in said first level in relation to said central and outer indexes indicating the extent and direction of slant of said green to said cup;
   the golfer relying upon said bubble position as designating a golf ball stroking path for a putter with such stroking force as will assure a curved path of travel of the golf ball into the cup.

5. In the green inclination level of claim 4, said first float level bearing against one side wall and extending along the bottom wall of said frame; and
   said second float level at one end engaging and secured to said first float level intermediate its ends and secured thereto and at its other end engaging and secured to the top of said frame.

6. In the green inclination level of claim 5, said sighting rod being spaced from the adjacent end of said first float level and one side wall of said frame.

7. In the green inclination level of claim 4, said cup having an upright pin with flag supported therein;
   said line of sight including a plane passing through said pin to verify that the flag pin is upright in said cup.

8. In the green inclination level of claim 4, said frame being adapted for and orienting to a second plane at right angles to said first plane and parallel to said line of sight;
   said frame being angularly adjustable in said second plane until its longitudinal axis is in parallel registry with the slope of the green along said line of sight;
   the position of the bubble in said second level in relation to said central and outer indexes indicating uphill or downhill slant of said green toward said cup as bearing upon said stroking force.

* * * * *